United States Patent
Farrenkopf

(10) Patent No.: US 6,229,293 B1
(45) Date of Patent: May 8, 2001

(54) DC-TO-DC CONVERTER WITH CURRENT MODE SWITCHING CONTROLLER THAT PRODUCES RAMPED VOLTAGE WITH ADJUSTABLE EFFECTIVE RAMP RATE

(75) Inventor: Douglas Robert Farrenkopf, Campbell, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/415,314

(22) Filed: Oct. 8, 1999

(51) Int. Cl.[7] .................................................... G05F 1/40
(52) U.S. Cl. ............................................ 323/288; 323/222
(58) Field of Search .................................... 323/288, 222, 323/284, 285

(56) References Cited

U.S. PATENT DOCUMENTS

| | | | |
|---|---|---|---|
| 3,577,007 | 5/1971 | Cross | 307/228 |
| 4,284,906 | 8/1981 | Manfredi | 307/228 |
| 4,837,495 | * 6/1989 | Zansky | 323/222 |
| 4,975,820 | 12/1990 | Szepesi | 363/21 |
| 5,146,154 | * 9/1992 | Lippmann et al. | 323/367 |
| 5,253,155 | 10/1993 | Yamamoto | 363/71 |
| 5,513,094 | 4/1996 | Stanley | 363/98 |
| 5,640,315 | 6/1997 | Hirano et al. | 363/41 |

* cited by examiner

Primary Examiner—Peter S. Wong
Assistant Examiner—Gary L. Laxton

(74) Attorney, Agent, or Firm—Girard & Equitz LLP

(57) ABSTRACT

A DC-to-DC converter which includes a current mode switching controller or regulator chip (which includes an oscillator producing a ramped voltage which periodically increases at a fixed ramp rate), circuitry including a current sense resistor external to the integrated circuit controller, and ramp adjustment circuitry (including at least one element external to the integrated circuit controller) which sets the effective ramp rate of the oscillator's ramped voltage. The external element of the ramp adjustment circuitry can be a resistor or a capacitor, or circuitry comprising both a resistor and capacitor. Another aspect of the invention is a DC-to-DC conversion method using a current mode switching controller or regulator chip (controller chip) including an oscillator which produces a ramped voltage, and external circuitry (coupled to the controller chip) including a current sense resistor across which a feedback voltage is developed, including the steps of operating the controller chip to switch on the power switch periodically and switch off the power switch at times determined by comparison of a feedback signal indicative of the feedback voltage and an adjustment voltage, with a reference signal indicative of the ramped voltage and a reference potential, where comparison of the feedback signal with the reference signal is effectively comparison of the feedback voltage with the difference between the reference potential and an effective ramped voltage determined by the ramped voltage and the adjustment voltage; and developing the adjustment voltage across at least one adjustment element external to the controller chip such that the adjustment voltage varies in phase with the ramped voltage and periodically increases at a fixed adjustment rate determined by the at least one adjustment element.

18 Claims, 9 Drawing Sheets

DC-TO-DC CONVERTER WITH CURRENT MODE SWITCHING CONTROLLER THAT PRODUCES RAMPED VOLTAGE WITH ADJUSTABLE EFFECTIVE RAMP RATE

BACKGROUND OF THE INVENTION

1. Field of the Invention

The present invention relates to switching power supply circuitry which employs current mode control to achieve output voltage regulation. More specifically, the invention relates to DC-to-DC converters which include a current mode switching controller or regulator (implemented as an integrated circuit, including an oscillator which produces a ramped voltage which periodically increases at a fixed ramp rate), circuitry (including a current sense resistor) external to the integrated circuit controller or regulator, and ramp adjustment circuitry (including an element external to the integrated circuit) which sets the effective ramp rate of the oscillator's ramped voltage.

2. Description of the Related Art

FIG. 1 is a conventional DC-to-DC converter which includes current mode switching controller 1 which is implemented as an integrated circuit (chip), and boost converter circuitry which is external to controller chip 1. The boost converter circuitry comprises NMOS transistor N1 (which functions as a power switch), inductor L, current sense resistor $R_s$, Schottky diode D, capacitor $C_{out}$, feedback resistor divider $R_{F1}$ and $R_{F2}$, compensation resistor $R_c$, and compensation capacitor $C_c$, connected as shown. The FIG. 1 circuit produces a regulated DC output voltage $V_{out}$ across load $R_o$, in response to input DC voltage $V_{in}$.

Controller chip 1 includes oscillator 2 (having a first output and a second output), comparator 8, driver 6 which produces an output potential $V_{DR}$ at pad 12 (to which the gate of switch N1 is coupled), latch 4 (having "set" terminal coupled to oscillator 2, "reset" terminal coupled to the output of comparator 8, and an output coupled to the input of driver 6), error amplifier 10 (having a non-inverting input maintained at reference potential $V_{ref}$), and circuit 9 (having a first input coupled to the second output of oscillator 2, a second input coupled to pad 13, and an output coupled to the inverting input of comparator 8).

Pad 13 is at potential $V_c$, which is determined by the output of error amplifier 10 (in turn determined by the difference between the instantaneous potential at Node A and the reference potential $V_{ref}$) and the values of external resistor $R_c$ and capacitor $C_c$. Reference potential $V_{ref}$ is set (in a well known manner) by circuitry within chip 1, and is normally not varied during use of the circuit. In order to set (or vary) the regulated level of the output voltage $V_{out}$, resistors $R_{F1}$ and $R_{F2}$ with the appropriate resistance ratio $R_{F1}/R_{F2}$ are employed.

Oscillator 2 asserts a clock pulse train (having fixed frequency and waveform as indicated) at its first output, and each positive-going leading edge of this pulse train sets latch 4. Each time latch 4 is set, the potential $V_{DR}$ asserted by driver 6 to the gate of transistor N1 causes transistor N1 to turn on, which in turn causes current $I_L$ from the source of N1 to increase in ramped fashion (more specifically, the current $I_L$ increases as a ramp when transistor N1 is on, and is zero when transistor N1 is off. The current through diode D is zero when N1 is on, it increases sharply when N1 switches from on to off, then falls as a ramp while N1 is off, and then decreases sharply to zero when N1 switches from off to on). Although transistor N1 turns on at times in phase with the periodic clock pulse train, it turns off at times (which depend on the relation between reference potential $V_{ref}$ and the instantaneous potential at Node A) that have arbitrary phase relative to the pulses of the periodic clock pulse train.

Oscillator 2 asserts ramped voltage $V_{osc}$ (which periodically increases at a fixed ramp rate and then decreases, with a waveform as indicated) at its second output. Circuit 9 asserts the potential $V_c-V_{osc}$ to the inverting input of comparator 8. Assertion of the potential $V_c-V_{osc}$ (rather than $V_c$) to comparator 8 is necessary for stability.

The non-inverting input of comparator 8 is at potential $V_s=I_L R_s$, which increases in ramped fashion in response to each "set" of latch 4 by oscillator 2. When $V_s=V_c-V_{osc}$ (after latch 4 has been set), the output of comparator 8 resets latch 4, which in turn causes the potential $V_{DR}$ asserted by driver 6 to the gate of transistor N1 to turn off transistor N1. Thus, by the described use of both of the signals output from oscillator 2, and feedback asserted to error amplifier 10 from Node A, controller chip 1 switches transistor N1 on and off with timing that regulates the output potential $V_{out}$ of the FIG. 1 circuit.

However, the conventional circuit of FIG. 1 has an important disadvantage. Although the ramp rate of the oscillator output $V_{osc}$ is fixed, the optimal value of this rate varies from application to application and depends on the particular implementation of the circuitry external to controller chip 1 (the optimal oscillator ramp rate depends on a number of parameters including the level of input potential $V_{in}$ and the inductance of inductor L). Thus, since the ramp rate of the oscillator output $V_{osc}$ is fixed, it is difficult to implement the FIG. 1 circuit so as to be stable for use with a wide range of values of input potential $V_{in}$, and with an acceptably wide range of characteristics of its external circuit components (such as the inductance of inductor L).

The inventor has recognized that it would be desirable to improve the FIG. 1 circuit so that the effective ramp rate of the oscillator output $V_{osc}$ is variable. The inventor has also recognized that it would be desirable to so improve the FIG. 1 circuit without increasing the number of external pins to the controller chip of the improved circuit.

Other conventional DC-to-DC converters include a current mode switching controller implemented as an integrated circuit (as does the FIG. 1 circuit), but also include circuitry (e.g., buck converter circuitry) other than boost converter circuitry that is external to the controller chip. The circuitry external to the controller chip includes a current sense resistor, and the controller chip includes an oscillator which produces a ramped voltage which periodically increases at a fixed ramp rate. This class of conventional converters is also subject to the above-noted disadvantage of the FIG. 1 circuit.

We shall use the expression "current mode switching regulator" chip herein to denote a circuit which performs the functions of a "current mode switching controller" chip (e.g., controller 1 of FIG. 1) but which also includes an on-board power switch. In contrast, a "current mode switching controller" chip does not include an on-board power switch and must be used with an external power switch (e.g., controller chip 1 of FIG. 1 is used with NMOS transistor N1 which is external to controller chip 1).

Another type of conventional DC-to-DC converter differs from the FIG. 1 circuit (or the above-mentioned variations thereon) in that the current mode switching controller chip is replaced by a current mode switching regulator chip. The current mode switching regulator chip in each such converter does not include a sense resistor, and instead is used with an external sense resistor (such as resistor $R_s$ of FIG. 1). For example, one such converter employs a current mode switching regulator chip that differs from chip 1 of FIG. 1 in that counterparts to NMOS transistor N1 and resistors $R_{f1}$ and $R_{f2}$ are implemented on-board the regulator chip. In this latter type of converter, the circuitry that is external to the regulator chip does not include an external power switch, but it does include an external sense resistor (e.g., an external sense resistor identical to resistor $R_s$ of FIG. 1). This class of conventional converters is also subject to the above-noted disadvantage of the FIG. 1 circuit.

SUMMARY OF THE INVENTION

In a class of embodiments, the invention is a DC-to-DC converter which includes a current mode switching controller (implemented as an integrated circuit, and including an oscillator which produces a ramped voltage which periodically increases at a fixed ramp rate), circuitry (including a current sense resistor) external to the integrated circuit controller, and ramp adjustment circuitry (including at least one element external to the integrated circuit controller) which sets the effective ramp rate of the oscillator's ramped voltage. In some such embodiments, the external element of the ramp adjustment circuitry (the element external to the integrated circuit controller) is a resistor. In other ones of such embodiments, the external element of the ramp adjustment circuitry is a capacitor. In some embodiments, the external element of the ramp adjustment circuitry is a resistor $R_r$ and the effective ramp rate is $dV_{osc}/dt+(d(i_r)/dt)R_r$, where $V_{osc}$ is the ramped voltage produced by the oscillator and $i_r$ is a current determined by the ramp adjustment circuitry. In other embodiments, the external element of the ramp adjustment circuitry is a capacitor $C_r$ and the effective ramp rate is $dV_{osc}/dt+i_r/C_r$, where $V_{osc}$ is the ramped voltage produced by the oscillator and $i_r$ is a current determined by the ramp adjustment circuitry. In other embodiments, the external element of the ramp adjustment circuitry comprises a capacitor $C_r$ and a resistor $R_{r2}$ (having one end at potential V and another end coupled to the capacitor $C_r$), and the effective ramp rate is $dV_{osc}/dt+V/R_{r2}C_r$, where $V_{osc}$ is the ramped voltage produced by the oscillator and $i_r$ is a current determined by the ramp adjustment circuitry.

In another class of embodiments, the invention is a DC-to-DC converter which differs from the previously mentioned embodiments only in that the current mode switching controller chip is replaced by a current mode switching regulator chip (with "current mode switching regulator" denoting a circuit which performs all functions of a "current mode switching controller" but which also includes an on-board power switch, in contrast with a "current mode switching controller" chip, which does not include an on-board power switch and must be used with an external power switch).

For convenience, the expression "current mode switching controller" chip (integrated circuit) is used in the claims to denote an integrated circuit in a broad class of integrated circuits consisting of both "current mode switching regulators" (each including an on-board power switch) and "current mode switching controllers" (which do not include an on-board power switch, but are used with an external power switch).

Another aspect of the invention is a method for performing DC-to-DC conversion using a current mode switching controller chip and external circuitry coupled to the controller chip, wherein the external circuitry includes a current sense resistor across which a feedback voltage is developed and the controller chip includes an oscillator which produces a ramped voltage which periodically increases at a fixed ramp rate, the method including the steps of:

operating the controller chip to switch on the power switch periodically and switch off the power switch at times determined by comparison of a feedback signal, indicative of the feedback voltage and an adjustment voltage, with a reference signal indicative of the ramped voltage and a reference potential, wherein said comparison of the feedback signal with the reference signal is effectively a comparison of the feedback voltage with the difference between the reference potential and an effective ramped voltage, wherein the effective ramp voltage is determined by the ramped voltage and the adjustment voltage; and developing the adjustment voltage across at least one adjustment element external to the controller chip, such that the adjustment voltage varies in ramped fashion in phase with the ramped voltage, wherein the adjustment voltage periodically increases at a fixed adjustment rate determined by at least one characteristic of said at least one adjustment element. In some such embodiments, the at least one external element is a resistor. In other ones of such embodiments, the at least one external element is a capacitor. In other ones of such embodiments, the at least one external element is a resistor and a capacitor coupled to the resistor.

DETAILED DESCRIPTION OF THE PREFERRED EMBODIMENTS

A preferred embodiment of the inventive circuit will be described with reference to FIGS. 2 and 3. This embodiment is a DC-to-DC converter which includes a controller chip (integrated circuit 101), external boost controller circuitry identical to that of FIG. 1, and ramp adjustment circuitry. The ramp adjustment circuitry comprises voltage-to-current conversion circuitry 11 and NMOS transistor N2 (connected as shown within chip 101) and resistor $R_r$ (connected between pad 14 and the source of transistor N1, external to controller chip 101). Elements of the circuit of FIGS. 2 and 3 which are identical to corresponding elements of FIG. 1 are identically labeled in FIGS. 1–3, and the foregoing description of these elements will not be repeated with reference to FIGS. 2 and 3.

Figure 1:
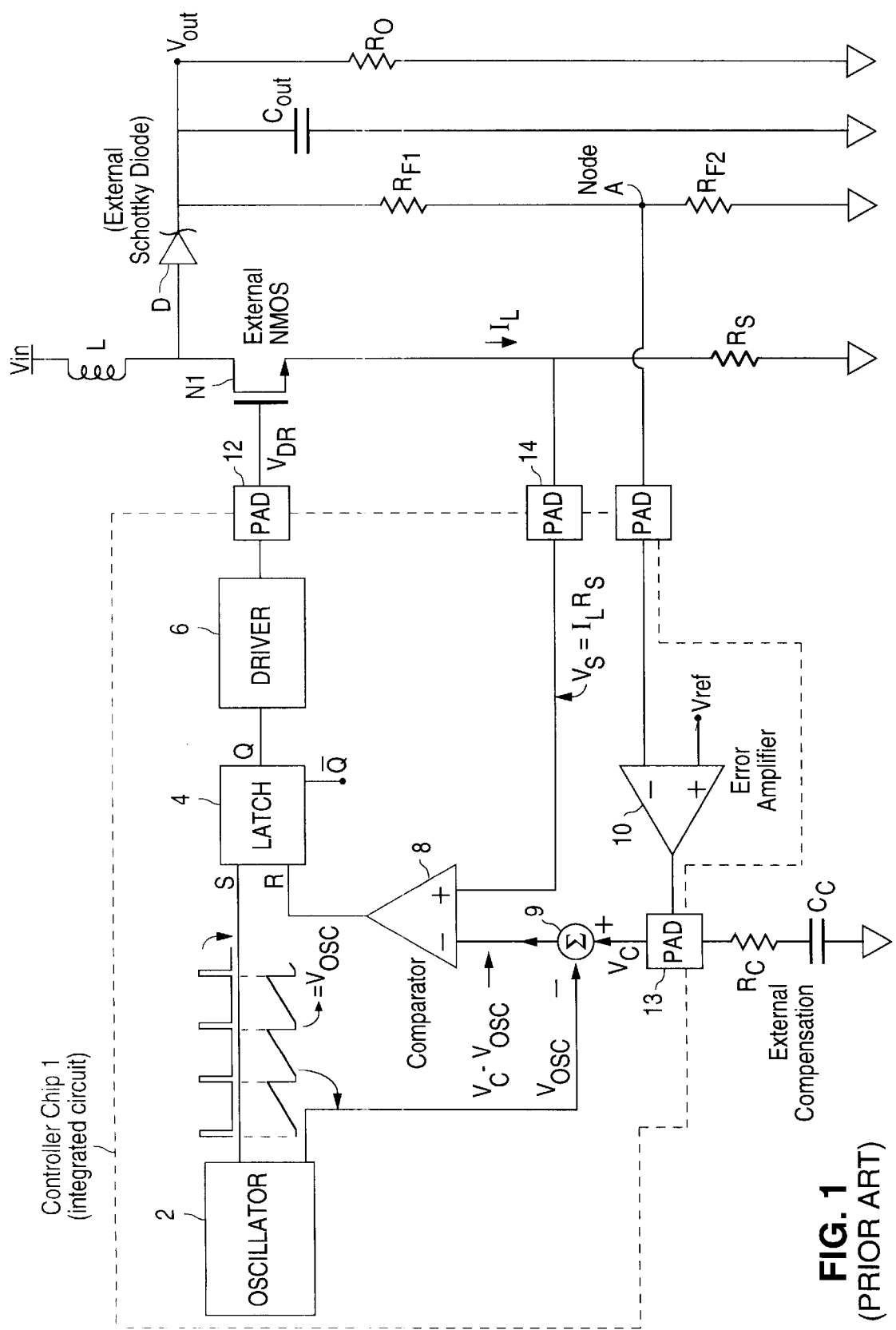
FIG. 1 is a schematic diagram of a conventional DC-to-DC converter including external boost controller circuitry.
Figure 2:
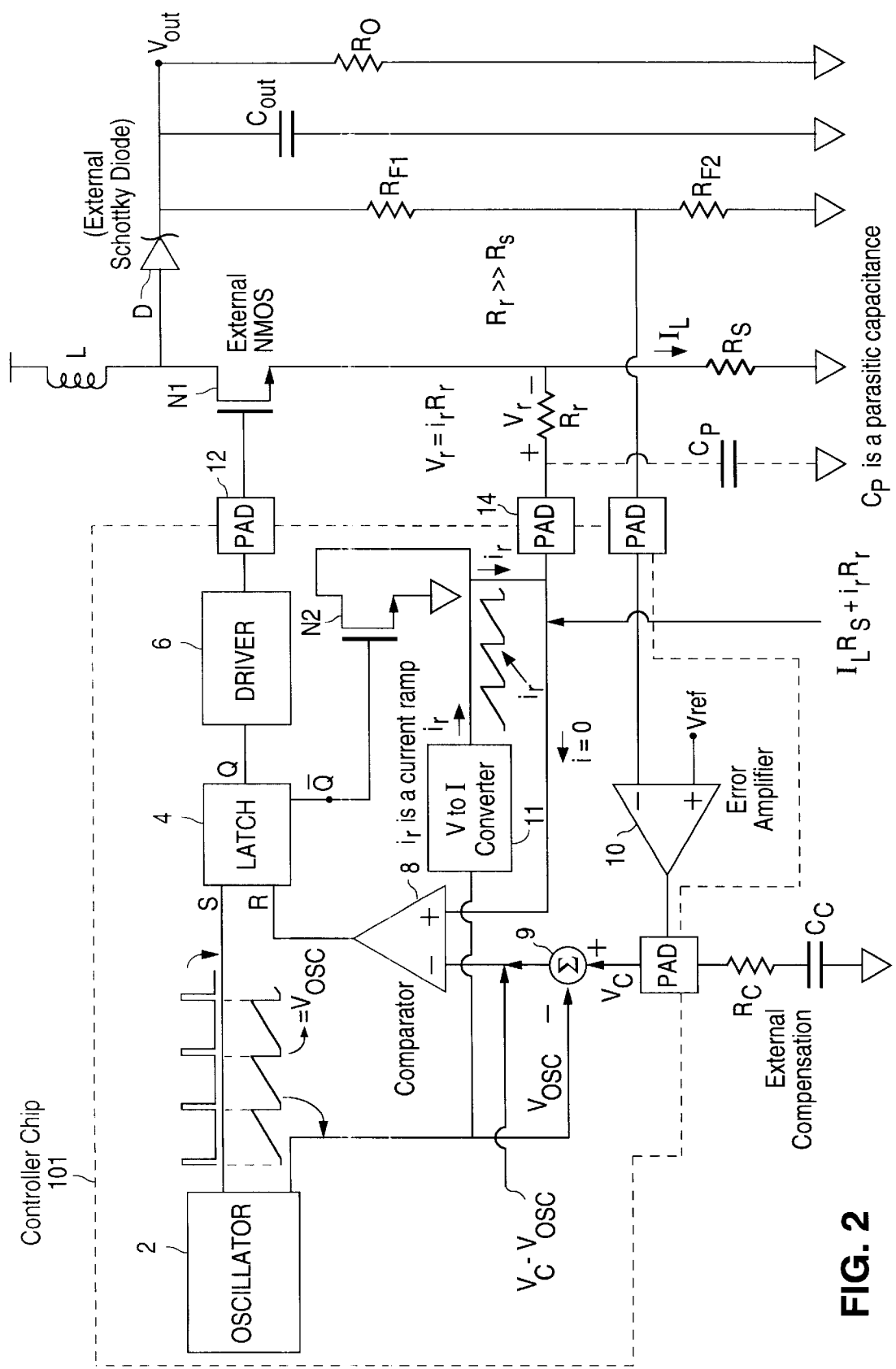
FIG. 2 is a schematic diagram of a preferred embodiment of the inventive DC-to-DC converter which includes a controller chip (integrated circuit 101), external boost controller circuitry, and ramp adjustment circuitry (including a resistor $R_r$ external to the controller chip).
Figure 3:
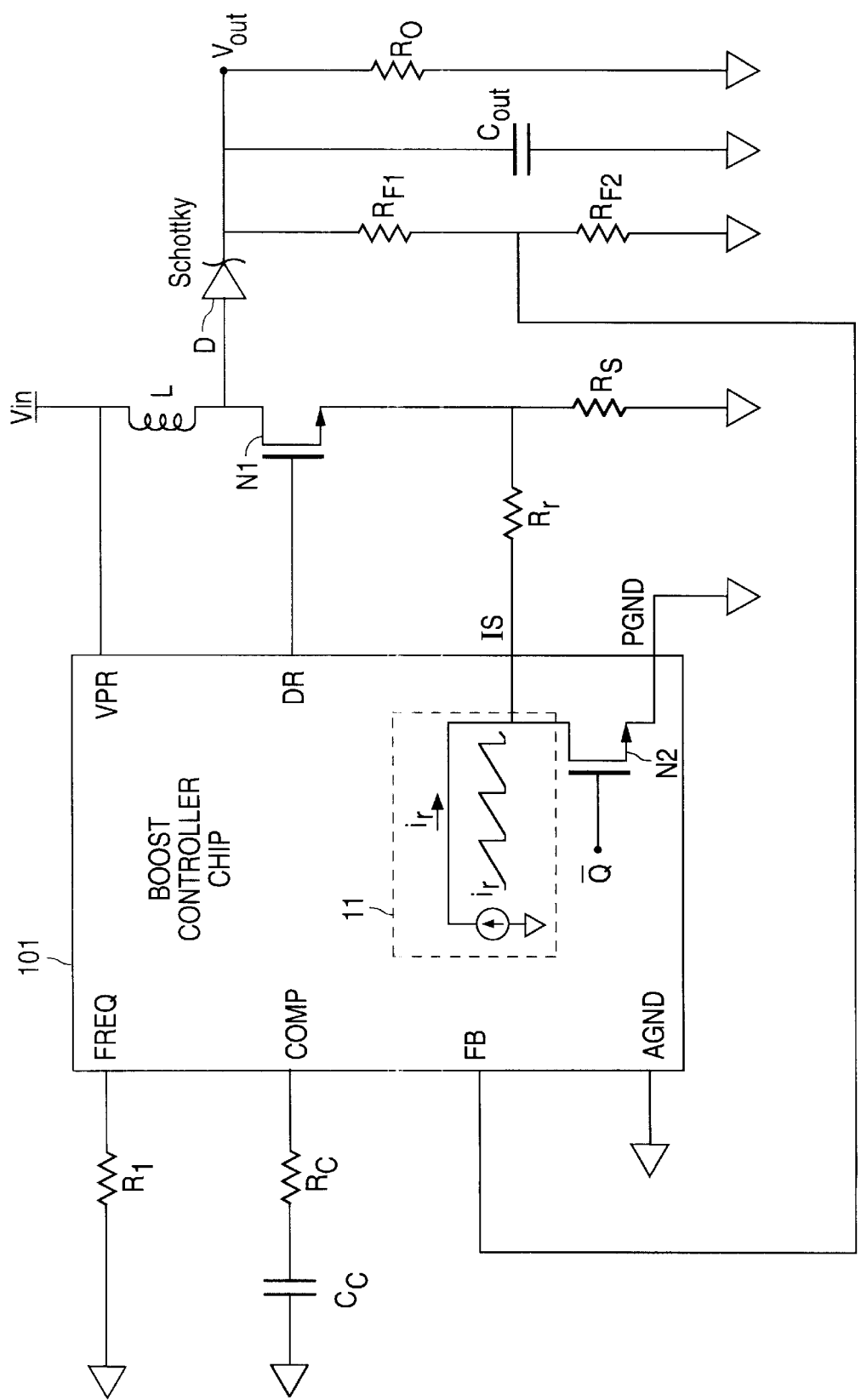
FIG. 3 is a simplified schematic diagram of the FIG. 2 embodiment, showing principal elements of the circuitry.

FIG. 3 is a simplified version of the circuit diagram of FIG. 2 embodiment, which omits elements 2, 4, 6, 8, 9, and 10 of controller chip 101 for clarity. FIG. 3 shows several pins of chip 101 which are not shown in FIG. 2: pins for connection to ground (pins "AGND" and "PGND", where AGND denotes analog ground, a sensitive ground for analog circuitry, and PGND denotes power ground which is noisier than AGND and should be separated from AGND), a pin for connection to a supply potential (pin "$V_{PR}$"), and a pin for connection to resistor $R_1$ (pin "FREQ"). The pin labeled "PGND" is connected to resistor $R_s$ in FIG. 3. The pin "FREQ" is connected to oscillator 2 such that the fixed frequency of the clock pulse train produced by oscillator 2 is determined by the value of resistor $R_1$. Chip 101 of FIGS. 2 and 3 has the same number of pins as does conventional chip 1 of FIG. 1.

Controller chip 101 of FIGS. 2 and 3 differs from chip 1 of FIG. 1 in that chip 101 includes voltage-to-current conversion circuitry 11 and NMOS transistor N2. Transistor N2 (whose drain is coupled to pad 14, and whose gate is coupled to the inverted output of latch 4) is provided to discharge, each time transistor N1 is switched off, any stray capacitance $C_p$ at pad 14.

In operation of the FIG. 2 circuit, when driver 6 has switched transistor N1 on (so that the current $I_L$ through the channel of N1 is increasing in ramped fashion), the potential at pad 14 (and thus at the non-inverting input of comparator 8) is $V'_s=I_L R_s+i_r R_r=V_s+i_r R_r$. The potential $V'_s$ increases in ramped fashion in response to each "set" of latch 4 by oscillator 2. After latch 4 has been set, the latch 4 resets (causing driver 6 to assert a potential $V_{DR}$ to the gate of transistor N1 which turns off transistor N1) when $V_c-V_{osc}=V_s+i_r R_r$. In other words, latch 4 resets and transistor N1 switches off when $V_c-(V_{osc}+i_r R_r)=V_s$. Current $i_r$, an internal current ramp produced by circuit 11 (in response to ramped voltage $V_{osc}$ produced by oscillator 2), has the same waveform and frequency as does the ramped voltage $V_{osc}$.

Thus, provision of the extra elements 11, N2, and $R_r$ in the FIG. 2 embodiment results in an effective ramp rate of $d(V_{osc}+i_r R_r)/dt$ for oscillator 2's ramped voltage. The magnitude of the added ramp compensation is $[d(i_r)/dt]R_r$, which is determined by the value of external resistor $R_r$ and the characteristics of circuit 11. Typically, the resistance of resistor $R_r$ in FIG. 2 is much greater than that of resistor $R_s$. If resistor $R_r$ is replaced by a short circuit (i.e., if $R_r=0$), the FIG. 2 converter will function essentially identically to the conventional FIG. 1 converter.

Figure 4:
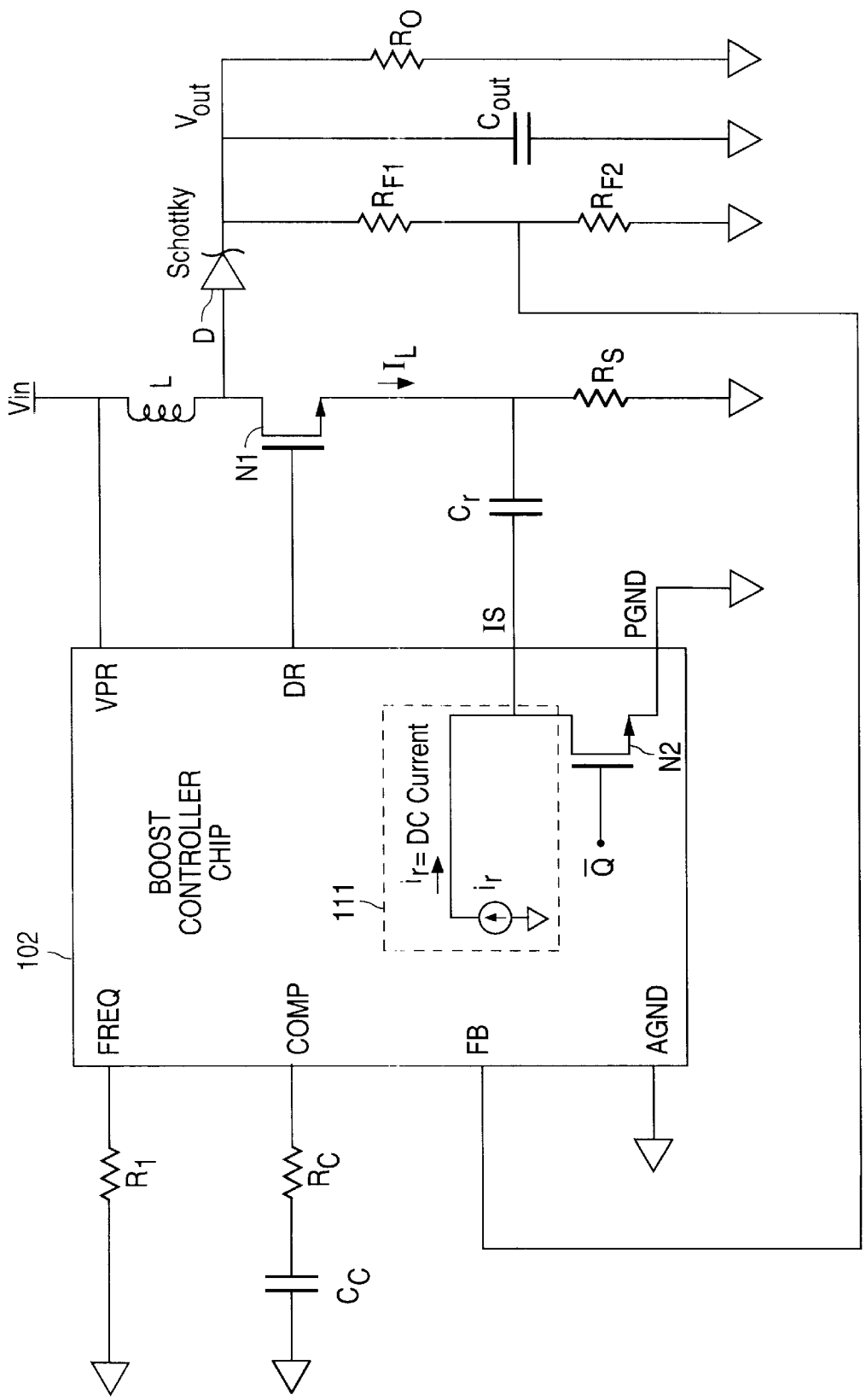
FIG. 4 is a simplified schematic diagram of a variation on the embodiment of FIGS. 2 and 3 in which the ramp adjustment circuitry includes a capacitor $C_r$ external to the controller chip.

FIG. 4 is a schematic diagram of a variation on the FIG. 3 embodiment of the invention in which the ramp adjustment circuitry includes external capacitor $C_r$ (rather than external resistor $R_r$) connected between the source of transistor N1 and the drain of transistor N2, and voltage-to-current converter 11 (which produces a periodic ramped current $i_r$) is replaced by DC current source 111 (which produces a DC current $i_r$). Controller chip 102 of FIG. 4 is identical to chip 101 of FIG. 3, except in that voltage-to-current converter 11 of chip 101 is replaced by DC current source 111 of chip 102. After latch 4 (within chip 102) has been set, the latch 4 resets (causing the driver 6 within chip 102 to assert a potential $V_{DR}$ to the gate of transistor N1 which turns off transistor N1) when $V_s=V_c-(V_{osc}+V_{adj})$, where $V_c$ is the potential at the pin labeled "COMP" (as in FIG. 3), $V_s=I_L R_s$, and $V_{adj}$ is the voltage across capacitor $C_r$ (which is a periodic ramped voltage). Thus, provision of the extra elements 111, N2, and $C_r$ in the FIG. 4 embodiment results in an effective ramp rate of $d(V_{osc}+V_{adj})/dt$ for the ramped voltage produced by the oscillator within chip 102 (the added ramp compensation is $d(V_{adj})/dt=i_r/C_r$).

Figure 5:
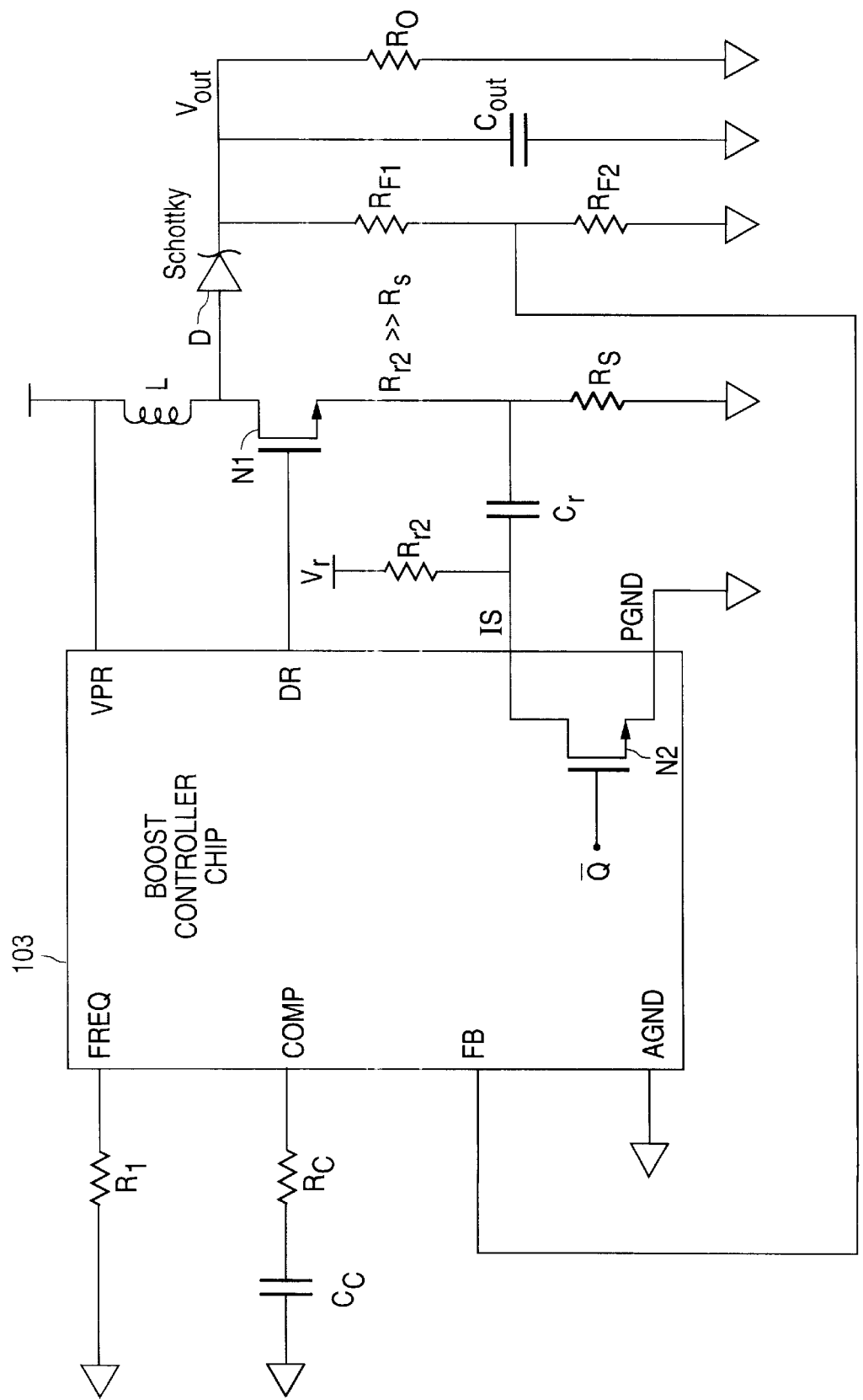
FIG. 5 is a simplified schematic diagram of another variation on the embodiment of FIGS. 2 and 3 in which the ramp adjustment circuitry includes a capacitor $C_r$ and a resistor $R_{r2}$ external to the controller chip.

FIG. 5 is a schematic diagram of a variation on the FIG. 3 embodiment of the invention in which the ramp adjustment circuitry includes both an external capacitor $C_r$ (connected between the source of transistor N1 and the drain of transistor N2) and a resistor $R_{r2}$ (connected between a supply potential $V_r$ and the drain of transistor N2), and voltage-to-current converter 11 is omitted. Controller chip 103 of FIG. 5 is identical to chip 101 of FIG. 3, except in that voltage-to-current converter 11 of chip 101 is omitted in chip 103. After latch 4 (within chip 103) has been set, the latch 4 resets (causing the driver 6 within chip 103 to assert a potential $V_{DR}$ to the gate of transistor N1 which turns off transistor N1 ) when $V_s=V_c-(V_{osc}+V_{adj2})$, where $V_c$ is the potential at the pin labeled "COMP" (as in FIG. 3), $V_s=I_L R_s$, and $V_{adj2}$ is the voltage across capacitor $C_r$ (which is a periodic ramped voltage). Thus, provision of the extra elements N2, $R_{r2}$, and $C_r$ in the FIG. 5 embodiment results in an effective ramp rate of $d(V_{osc}+V_{adj2})/dt$ for the ramped voltage produced by the oscillator within chip 103, so that the added ramp compensation is $d(V_{adj2})/dt=V_r/R_{r2}C_r$.

Figure 6:
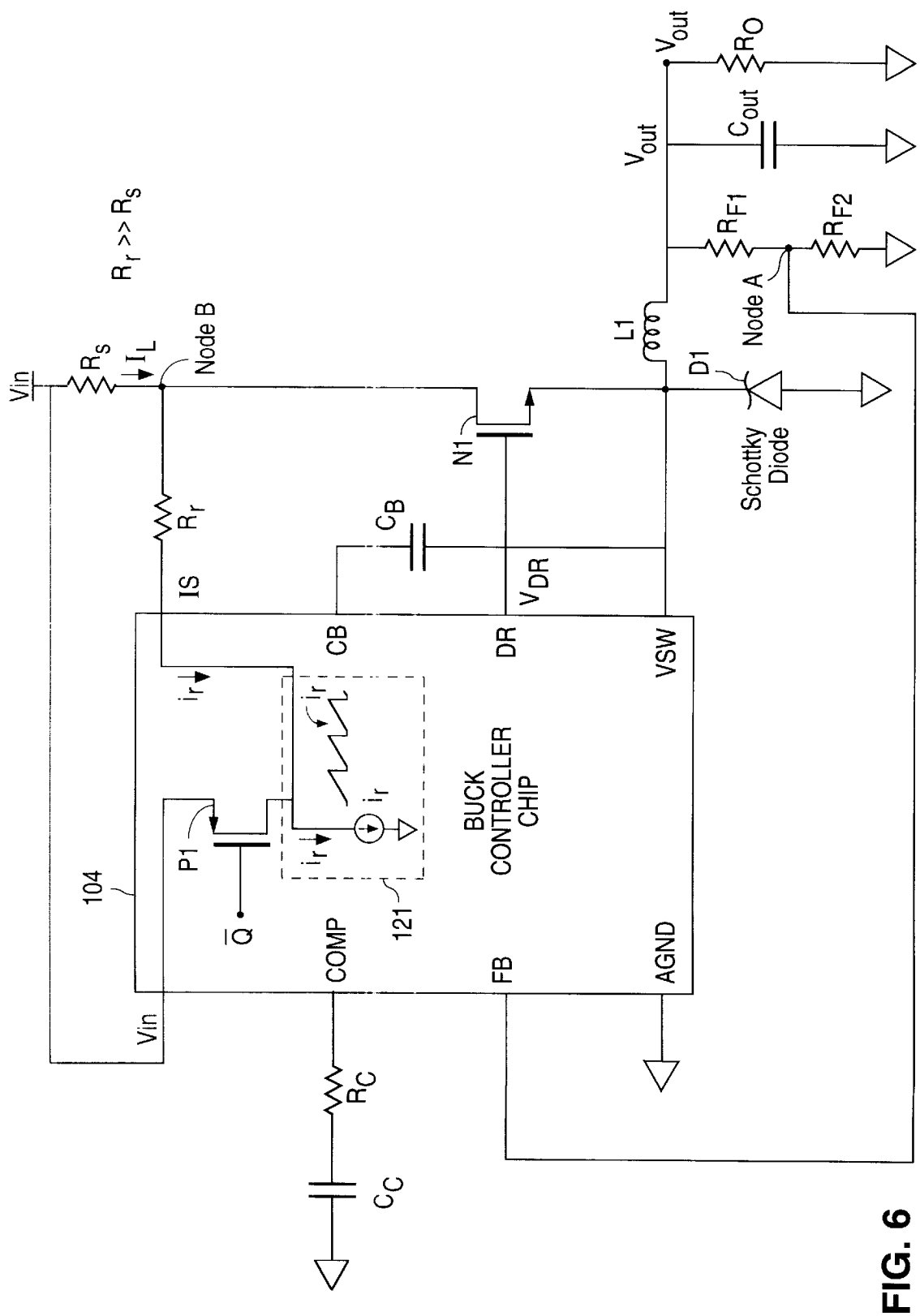
FIG. 6 is a simplified schematic diagram of another preferred embodiment of the inventive DC-to-DC converter which includes a controller chip (integrated circuit 104), external buck controller circuitry, and ramp adjustment circuitry (including a resistor $R_r$ external to the controller chip).

FIG. 6 is a simplified schematic diagram of another preferred embodiment of the inventive DC-to-DC converter which includes a controller chip (integrated circuit 104), external buck controller circuitry, and ramp adjustment circuitry (comprising resistor $R_r$ external to controller chip 104, and NMOS transistor N2 and current source 121 connected as shown within chip 104). The buck controller circuitry of FIG. 6 differs from the boost converter circuitry of FIGS. 1–5 in that the source of NMOS transistor N1 is coupled through inductor L1 to the output node (whereas in FIGS. 1–5, the drain of transistor N1 is coupled through diode D to the output node, and inductor L is coupled between the input potential $V_{in}$ and the source of N1 ), Schottky diode D1 is connected between ground and the source of N1 (replacing diode D of FIGS. 1–5), sense resistor $R_s$ is connected between the input potential $V_{in}$ and the drain of N1 (rather than between ground and the source of N1 as in FIGS. 1–5), and boost capacitor $C_B$ is coupled between chip 104 and the gate of transistor N1. The buck controller circuitry of FIG. 6 has conventional design, except in that it includes (in accordance with the present invention) resistor $R_r$ which is connected between the drain of transistor N1 and current source 121 of controller chip 104.

Controller chip 104 includes elements 2, 4, 6, 8, 9, and 10 of FIG. 2 (these elements are connected as shown in FIG. 2, but are not shown in FIG. 6 for simplicity). Chip 104 differs from chip 101 of FIG. 2 only in that it includes voltage-to-current converter 121 which sinks periodic ramped current $i_r$ from resistor $R_r$ (replacing converter 11 of FIG. 2 which sources ramped current $i_r$ to resistor $R_r$ of FIG. 2), in that it includes PMOS transistor P1 (replacing transistor N2 of FIG. 2) connected with its source coupled to input potential $V_{in}$, its drain coupled to resistor $R_r$, and its gate coupled to a level shifted inverted output of latch 4, and in minor respects apparent to those of ordinary skill in the art (including in that it has a pin coupled to boost capacitor $C_B$). Typically, the resistance of resistor $R_r$ in FIG. 6 is much greater than that of resistor $R_s$. Transistor P1 is provided to discharge, each time transistor N1 is switched off, any stray capacitance $C_p$ at the node connecting chip 104 with resistor $R_r$.

Chip 104 of FIG. 6 functions in essentially the same manner as does chip 101 of FIG. 3, including in that it turns on transistor N1 by setting latch 4 (in response to pulses from a clock pulse train produced by oscillator 2), and turns off transistor N1 by resetting latch 4 in response to a comparison of $V_c - V_{osc}$ (where $V_{osc}$ is a ramped voltage produced by oscillator 2 and $V_c$ is the potential at the pin labeled "COMP") with a feedback potential indicative of the potential at Node B (between resistor $R_s$ and the drain of N1) minus the voltage drop $i_r R_r$ across resistor $R_r$. After latch 4 (within chip 104) has been set, the latch 4 resets (causing driver 6 within chip 104 to assert a potential $V_{DR}$ to the gate of transistor N1 which turns off transistor N1) when $V_s = V_c - (V_{osc} + i_r R_r)$, where $V_s$ is the potential difference between $V_{in}$ at the potential at Node B and $i_r R_r$ is the voltage drop across resistor $R_r$ (which is a periodic ramped potential). Thus, provision of the elements 121, P1, and $R_r$ in the FIG. 6 embodiment results in an effective ramp rate of $d(V_{osc} + i_r R_r)/dt$ for the ramped voltage produced by the oscillator within chip 104, so that the added ramp compensation is $d(i_r R_r)/dt = [d(i_r)/dt] R_r$.

Figure 7:
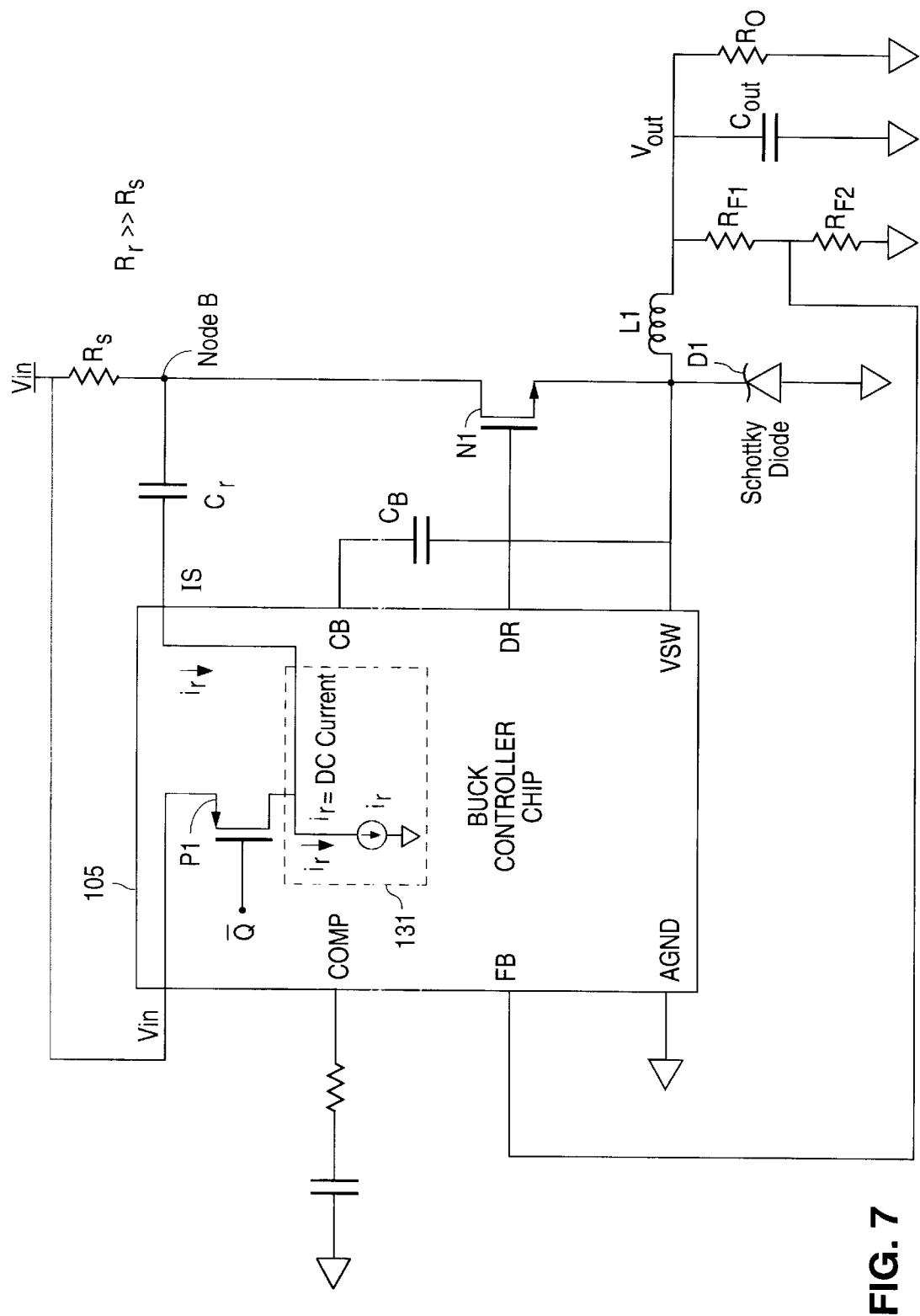
FIG. 7 is a simplified schematic diagram of a variation on the FIG. 6 embodiment of the invention in which the ramp adjustment circuitry includes a capacitor $C_r$ external to the controller chip.

FIG. 7 is a simplified schematic diagram of a variation on the FIG. 6 embodiment of the invention in which the ramp adjustment circuitry includes external capacitor $C_r$ (rather than external resistor $R_r$) connected between the drain of transistor N1 and the drain of transistor P1, and voltage-to-current converter 121 (which produces a periodic ramped current $i_r$) is replaced by DC current source 131 (which produces a DC current $i_r$). Controller chip 105 of FIG. 7 is identical to chip 104 of FIG. 6, except in that voltage-to-current converter 121 of chip 104 is replaced by DC current source 131 of chip 105. After latch 4 (within chip 105) has been set, the latch 4 resets (causing the driver 6 within chip 105 to assert a potential $V_{DR}$ to the gate of transistor N1 which turns off transistor N1) when $V_s = V_c - (V_{osc} + V_{adj})$, where $V_c$ is the potential at the pin labeled "COMP" (as in FIG. 6), $V_s$ is the potential at Node B, and $V_{adj}$ is the voltage across capacitor $C_r$ (which is a periodic ramped voltage). Thus, provision of the extra elements 131, P1, and $C_r$ in the FIG. 7 embodiment results in an effective ramp rate of $d(V_{osc} + V_{adj})/dt$ for the ramped voltage produced by the oscillator within chip 105, so that the added ramp compensation is $d(V_{adj})/dt = i_r/C_r$.

Figure 8:
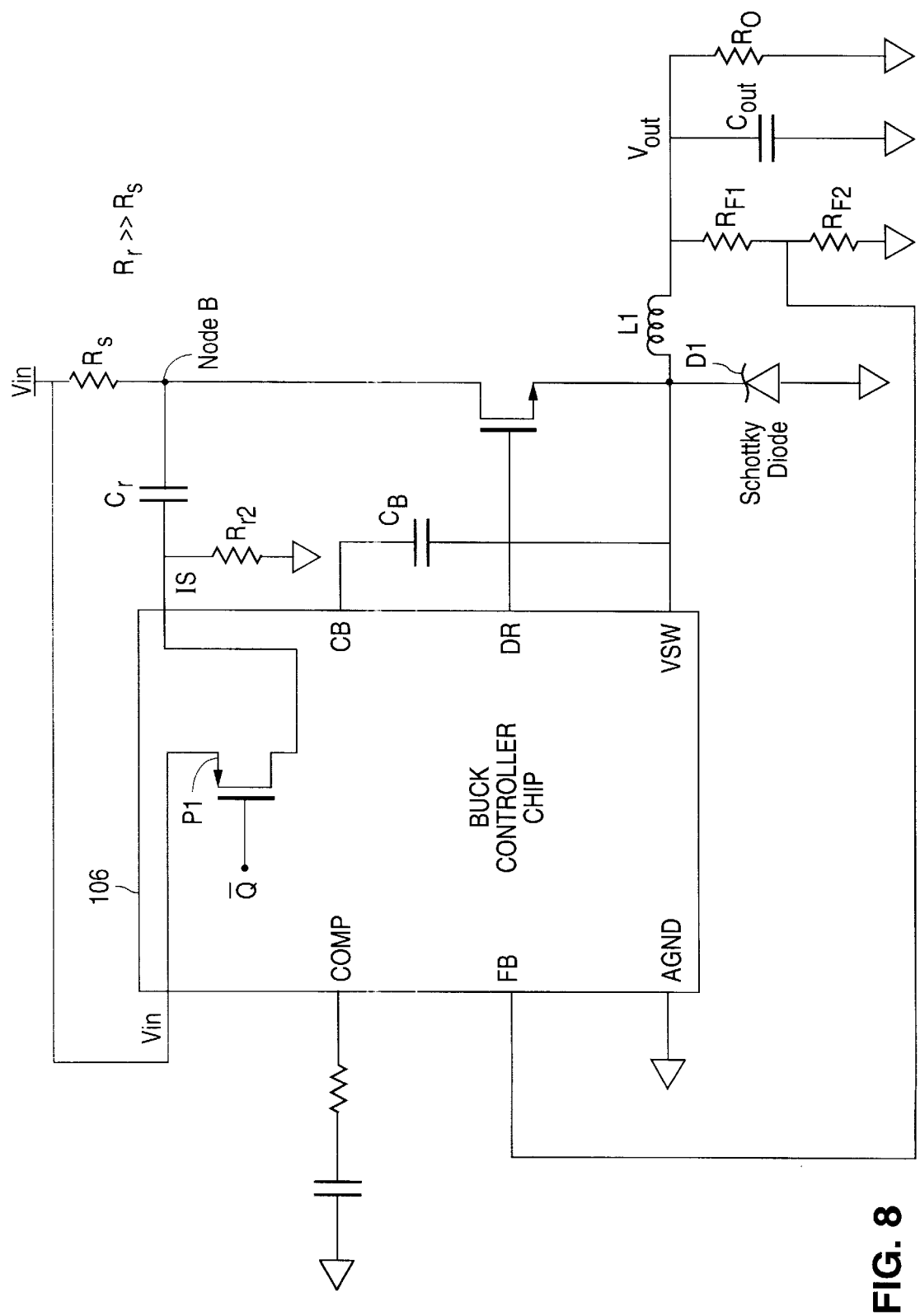
FIG. 8 is a simplified schematic diagram of another variation on the FIG. 6 embodiment of the invention in which the ramp adjustment circuitry includes a capacitor $C_r$ and a resistor $R_{r2}$ external to the controller chip.

FIG. 8 is a schematic diagram of a variation on the FIG. 6 embodiment of the invention in which the ramp adjustment circuitry includes both an external capacitor $C_r$ (connected between the drain of transistor N1 and the drain of transistor P1) and a resistor $R_{r2}$ (connected between ground and the drain of transistor P1), and voltage-to-current converter 121 is omitted. Controller chip 106 of FIG. 8 is identical to chip 104 of FIG. 6, except in that voltage-to-current converter 121 of chip 104 is omitted in chip 106. After latch 4 (within chip 106) has been set, the latch 4 resets (causing the driver 6 within chip 106 to assert a potential $V_{DR}$ to the gate of transistor N1 which turns off transistor N1) when $V_s = V_c - (V_{osc} + V_{adj2})$, where $V_c$ is the potential at the pin labeled "COMP", $V_s$ is the potential at Node B, and $V_{adj2}$ is the voltage across capacitor $C_r$ (which is a periodic ramped voltage). Thus, provision of the extra elements P1, $R_{r2}$, and $C_r$ in the FIG. 8 embodiment results in an effective ramp rate of $d(V_{osc} + V_{adj2})/dt$ for the ramped voltage produced by the oscillator within chip 106, so that the added ramp compensation is $d(V_{adj2})/dt = V_{in}/R_{r2} C_r$.

Figure 2A:
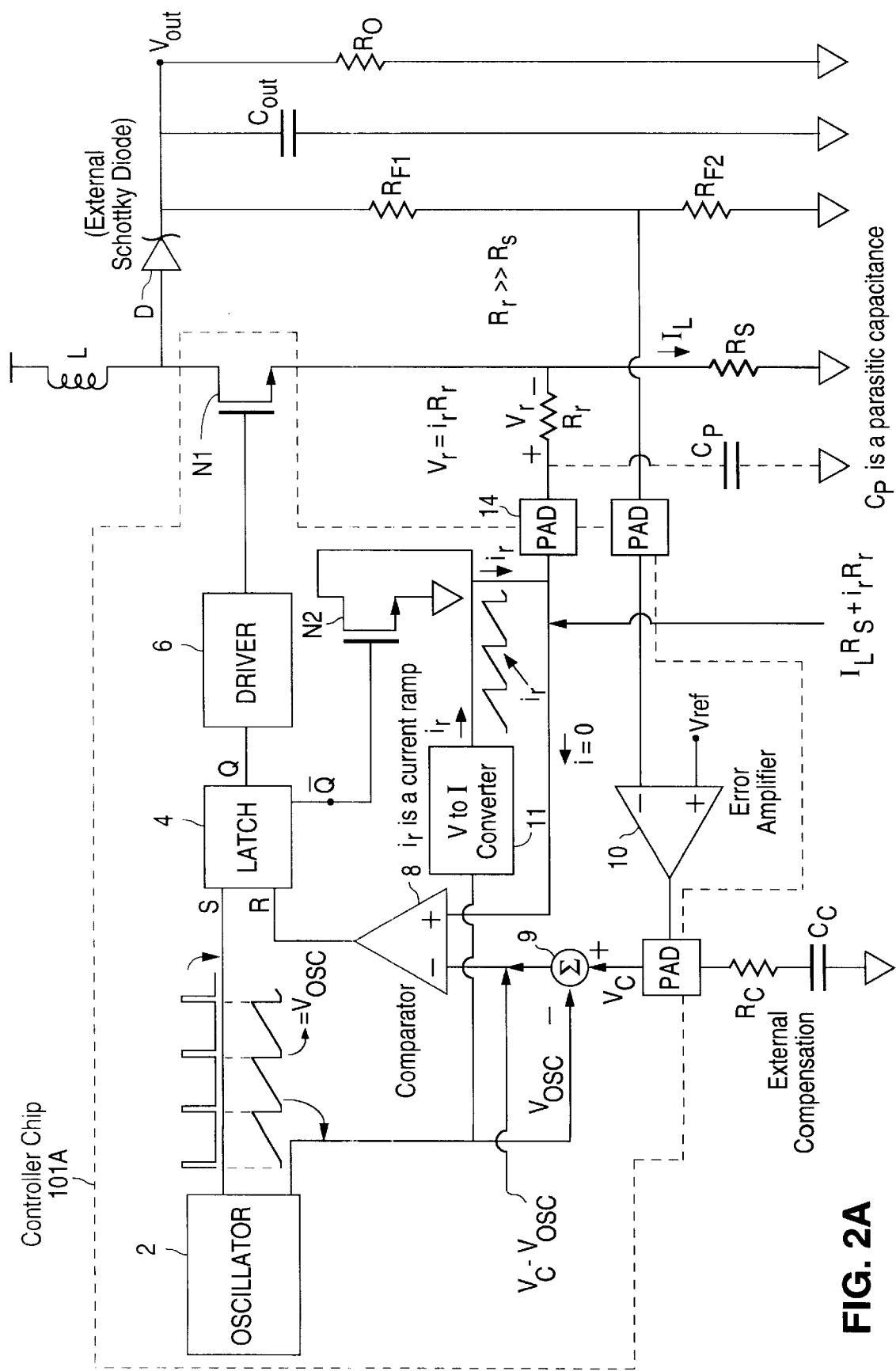
FIG. 2A is a schematic diagram of a variation on the FIG. 2 embodiment, in which power switch N1 (an NMOS transistor) is incorporated within current mode switching regulator chip 101A.

In other embodiments, the invention is a DC-to-DC converter which differs from the above-described embodiments only in that the current mode switching controller chip is replaced by a current mode switching regulator chip (with "current mode switching regulator" denoting a circuit which performs all functions of a "current mode switching controller" but which also includes an on-board power switch, in contrast with a "current mode switching controller" chip, which does not include an on-board power switch and must be used with an external power switch), and the external power switch is replaced by the power switch that is implemented on-board the regulator chip. For example, one such embodiment is that of FIG. 2A embodiment, which differs from the FIG. 2 embodiment in that current mode switching controller chip 101 (of FIG. 2) is replaced by current mode switching regulator chip 101A which includes all elements of chip 101 and also an integrated circuit implementation of NMOS transistor N1 (which functions as a power switch), and in which pad 12 of FIG. 2 is replaced by two pads of regulator chip 101A that are coupled respectively to the source and drain of the integrated circuit implementation of NMOS transistor N1.

In a variation on each embodiment including transistor N2 (which is a discharge switch), transistor N2 is omitted, and in a variation on each embodiment including transistor P1 (which is also a discharge switch), transistor P1 is omitted. Such variations are useful where both the parasitic capacitance ($C_p$) and the resistance $R_r$ are low enough so that the time constant $R_r C_p$ is sufficiently low that $C_p$ can simply be discharged through resistors $R_r$ and $R_s$.

Although only a number of preferred embodiments have been described in detail herein, those having ordinary skill in the art will certainly understand that many modifications are possible without departing from the teachings hereof. All such modifications are intended to be encompassed within the following claims.

What is claimed is:

1. A DC-to-DC converter for producing a regulated output potential in response to an input potential, said DC-to-DC converter comprising:

a current mode switching controller implemented as an integrated circuit, wherein the current mode switching controller includes an oscillator configured to produce a ramped voltage which periodically increases at a fixed ramp rate, and circuitry configured to generate control signals for switching on a power switch periodically and switching off the power switch at times determined by comparison of a feedback signal, indicative of a feedback voltage and an adjustment voltage, with a reference signal indicative of the ramped voltage and a reference potential, wherein said comparison of the feedback signal with the reference signal is effectively a comparison of the feedback voltage with the difference between the reference potential and an effective ramped voltage having an effective ramp rate, wherein the effective ramp voltage is determined by the ramped voltage and the adjustment voltage;

external circuitry coupled to the controller, wherein the external circuitry includes a current sense resistor across which the feedback voltage develops, and one of the controller and the external circuitry includes the power switch; and ramp adjustment circuitry coupled to the controller and to the external circuitry, the ramp adjustment circuitry including at least one adjustment element external to the controller across which the adjustment voltage develops, wherein the ramp adjustment circuitry is configured such that the adjustment voltage varies in ramped fashion in phase with the ramped voltage and the adjustment voltage periodically increases at a fixed adjustment rate determined by at least one characteristic of said at least one adjustment element.

2. The DC-to-DC converter of claim 1, wherein the at least one adjustment element of the ramp adjustment circuitry is a resistor coupled to the current sense resistor and the external circuitry includes the power switch.

3. The DC-to-DC converter of claim 2, wherein the power switch is a transistor having a gate coupled to the current mode switching controller and a channel coupled in series with the current sense resistor.

4. The DC-to-DC converter of claim 2, wherein the at least one adjustment element of the ramp adjustment circuitry is a resistor coupled to the current sense resistor and the current mode switching controller includes the power switch.

5. The DC-to-DC converter of claim 1, wherein the at least one adjustment element of the ramp adjustment circuitry is a resistor $R_r$ coupled to the current sense resistor, and the effective ramp rate is $dV_{osc}/dt+(d(i_r)/dt)R_r$, where $V_{osc}$ is the ramped voltage produced by the oscillator and $i_r$ is a current determined by the ramp adjustment circuitry.

6. The DC-to-DC converter of claim 1, wherein the at least one adjustment element of the ramp adjustment circuitry is a capacitor coupled to the current sense resistor and the external circuitry includes the power switch.

7. The DC-to-DC converter of claim 6, wherein the power switch is a transistor having a gate coupled to the current mode switching controller and a channel coupled in series with the current sense resistor.

8. The DC-to-DC converter of claim 6, wherein the at least one adjustment element of the ramp adjustment circuitry is a capacitor coupled to the current sense resistor and the current mode switching controller includes the power switch.

9. The DC-to-DC converter of claim 1, wherein the at least one adjustment element of the ramp adjustment circuitry is a capacitor $C_r$ coupled to the current sense resistor, and the effective ramp rate is $dV_{osc}/dt+i_r/C_r$, where $V_{osc}$ is the ramped voltage produced by the oscillator and $i_r$ is a current determined by the ramp adjustment circuitry.

10. The DC-to-DC converter of claim 1, wherein the at least one adjustment element of the ramp adjustment circuitry is a capacitor $C_r$ coupled to the current sense resistor, and a resistor $R_{r2}$ having one end maintained at potential V and another end coupled to the capacitor $C_r$, wherein the effective ramp rate is $dV_{osc}/dt+V/R_{r2} C_r$, where $V_{osc}$ is the ramped voltage produced by the oscillator and $i_r$ is a current determined by the ramp adjustment circuitry.

11. The DC-to-DC converter of claim 10, wherein the potential V is the input potential, and the external circuitry is boost converter circuitry.

12. The DC-to-DC converter of claim 1, wherein the external circuitry is boost converter circuitry.

13. The DC-to-DC converter of claim 1, wherein the external circuitry is buck converter circuitry.

14. The circuit of claim 1, wherein the external circuitry includes a feedback resistor divider coupled to assert a second feedback signal to the controller, wherein the second feedback signal is indicative of a potential proportional to the regulated output potential, and wherein the controller includes an error amplifier having a first input coupled to receive the second feedback signal, a second input coupled to receive a second potential, and an output at said reference potential.

15. A method for performing DC-to-DC conversion using a current mode switching controller chip and external circuitry coupled to the controller chip, wherein the external circuitry includes a current sense resistor across which a feedback voltage is developed and the controller chip includes an oscillator which produces a ramped voltage which periodically increases at a fixed ramp rate, the method including the steps of:

(a) operating the controller chip to switch on the power switch periodically and switch off the power switch at times determined by comparison of a feedback signal, indicative of the feedback voltage and an adjustment voltage, with a reference signal indicative of the ramped voltage and a reference potential, wherein said comparison of the feedback signal with the reference signal is effectively a comparison of the feedback voltage with the difference between the reference potential and an effective ramped voltage, wherein the effective ramp voltage is determined by the ramped voltage and the adjustment voltage; and (b) developing the adjustment voltage across at least one adjustment element external to the controller chip, such that the adjustment voltage varies in ramped fashion in phase with the ramped voltage, wherein the adjustment voltage periodically increases at a fixed adjustment rate determined by at least one characteristic of said at least one adjustment element.

16. The method of claim 15, wherein the at least one adjustment element external to the controller chip is a resistor $R_r$ coupled to the current sense resistor, the adjustment voltage developed in step (b) has magnitude $i_rR_r$, where $i_r$ is the current through the resistor $R_r$, and the effective ramped voltage has an effective ramp rate of $dV_{osc}/dt+(d(i_r)/dt)R_r$, where $V_{osc}$ is the ramped voltage produced by the oscillator.

17. The method of claim 15, wherein the at least one adjustment element external to the controller chip is a capacitor $C_r$ coupled to the current sense resistor, the adjustment voltage developed in step (b) has time derivative $i_r/C_r$, where $i_r$ is a current supplied by a current source in the controller, said current source being coupled to the capacitor $C_r$, and the effective ramped voltage has an effective ramp rate of $dV_{osc}/dt+i_r/C_r$, where $V_{osc}$ is the ramped voltage produced by the oscillator.

18. The method of claim 15, wherein the at least one adjustment element external to the controller chip comprises a a capacitor $C_r$ coupled to the current sense resistor, and a resistor $R_{r2}$ having one end maintained at potential V and another end coupled to the capacitor $C_r$, the adjustment voltage developed in step (b) has time derivative $V/R_rC_r$, and the effective ramped voltage has an effective ramp rate of $dV_{osc}/dt+V/R_{r2} C_r$, where $V_{osc}$ is the ramped voltage produced by the oscillator and $i_r$ is a current determined by the ramp adjustment circuitry.

* * * * *